C. W. PARKER.
RETARDING DEVICE OR DASH POT.
APPLICATION FILED OCT. 29, 1912.
1,201,980.
Patented Oct. 17, 1916.
3 SHEETS—SHEET 1.
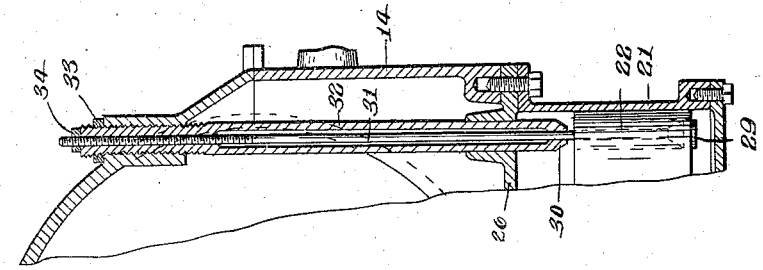
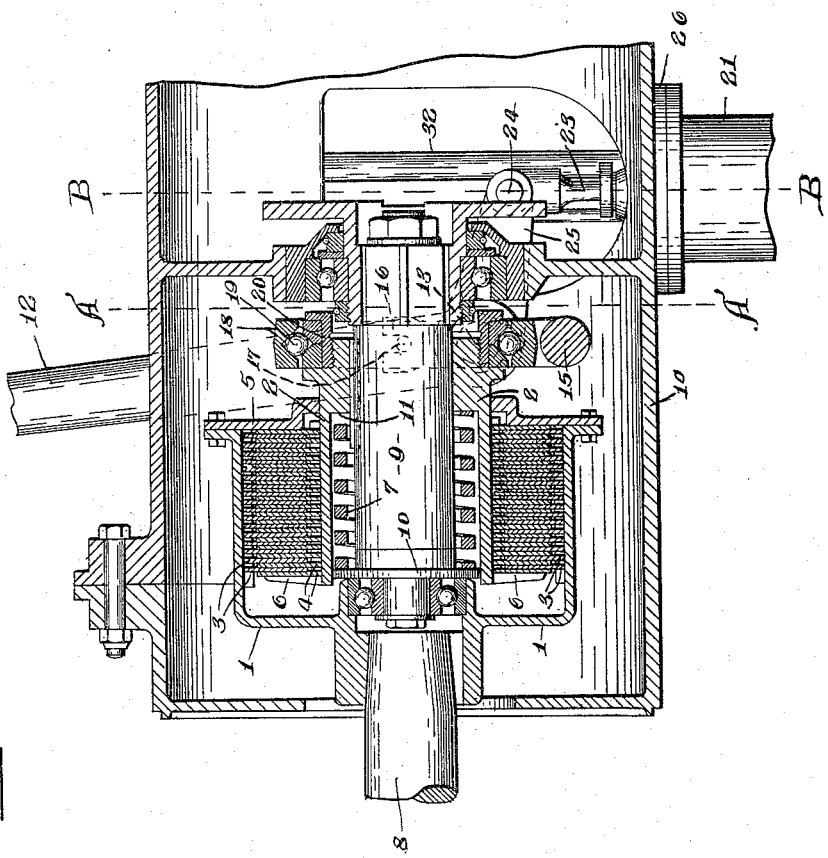
WITNESSES:
INVENTOR
Clark W Parker
BY
ATTORNEYS

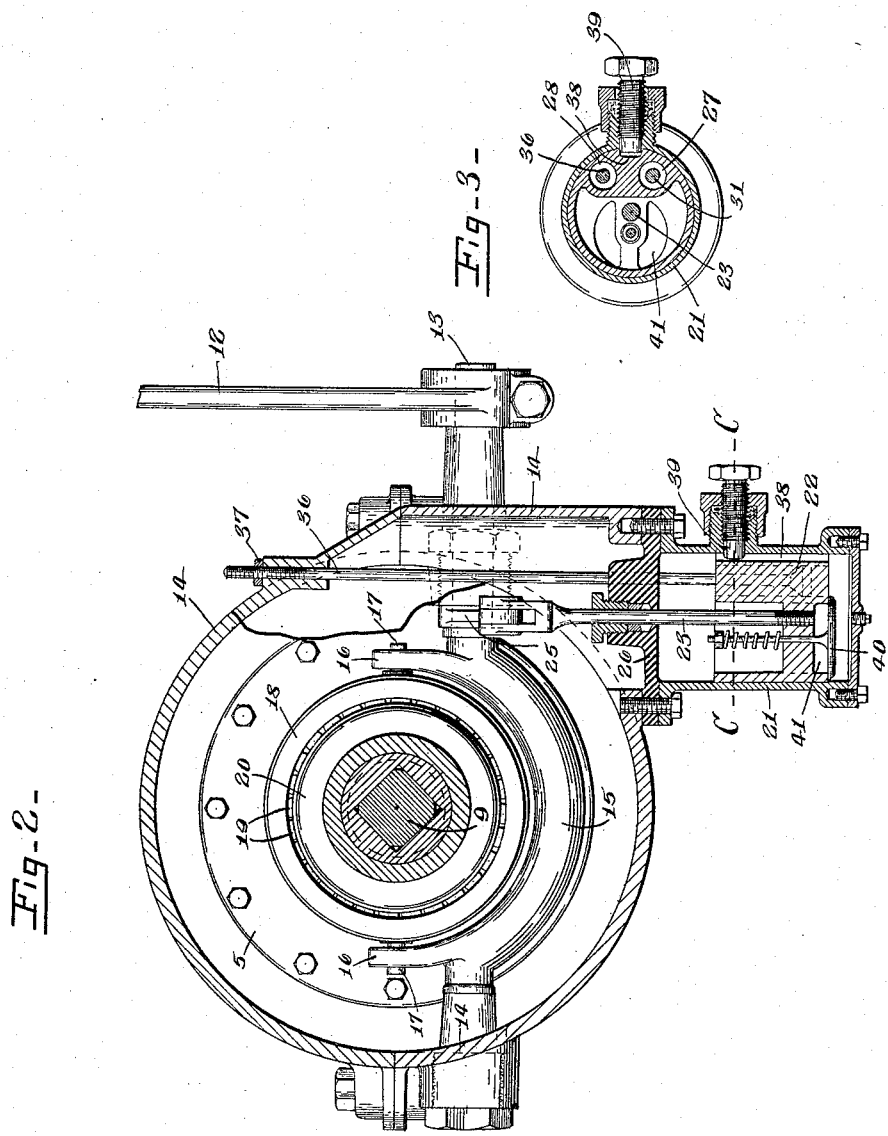

C. W. PARKER.
RETARDING DEVICE OR DASH POT.
APPLICATION FILED OCT. 29, 1912.
1,201,980.
Patented Oct. 17, 1916.
3 SHEETS—SHEET 3.
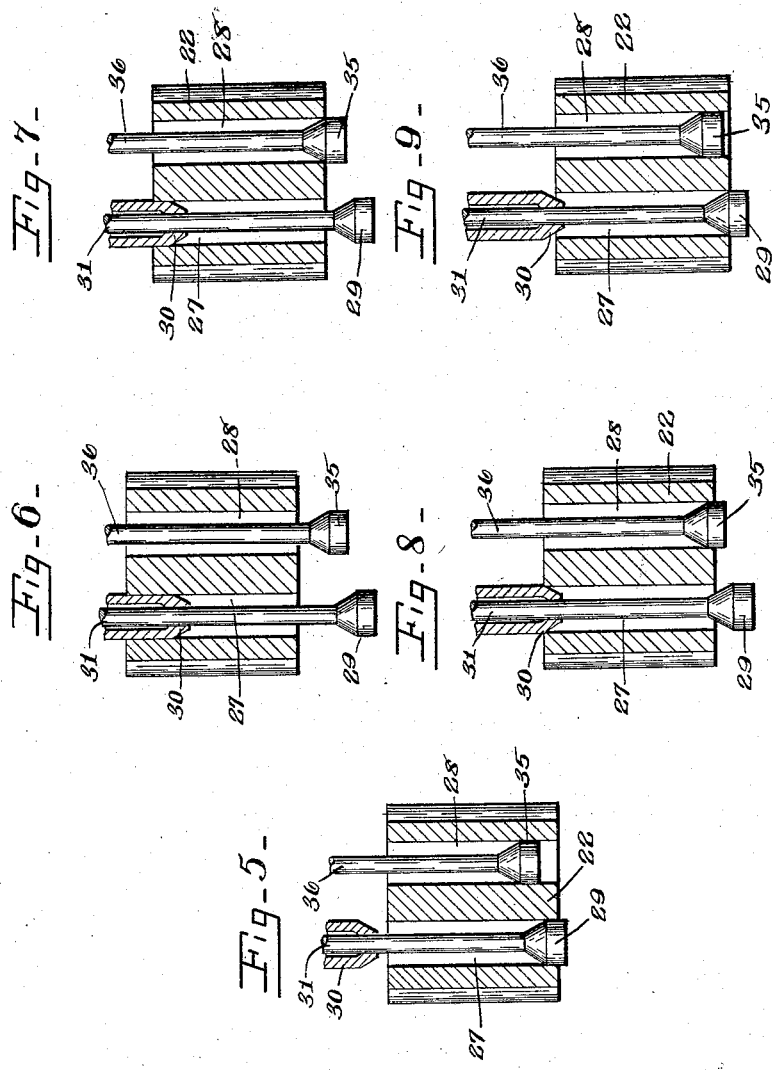
WITNESSES:
INVENTOR
Clark W. Parker
BY
ATTORNEYS

UNITED STATES PATENT OFFICE.

CLARK W. PARKER, OF FULTON, NEW YORK, ASSIGNOR, BY MESNE ASSIGNMENTS, TO JAMES H. DUNN, OF SPRINGFIELD, MASSACHUSETTS.

RETARDING DEVICE OR DASH-POT.

1,201,980. Specification of Letters Patent. Patented Oct. 17, 1916.

Original application filed December 28, 1910, Serial No. 599,690. Divided and this application filed October 29, 1912. Serial No. 728,361.

*To all whom it may concern:*

Be it known that I, CLARK W. PARKER, of Fulton, in the county of Oswego and State of New York, have invented a certain new and useful Retarding Device or Dash-Pot, of which the following is a specification.

My invention has for its object the production of a retarding device or dash pot which is particularly applicable for use in connection with the friction or multiple disk clutch of a motor vehicle, to control the frictional engagement of the friction elements or disks of the clutch, said device having means for effecting variable resistances at certain periods during each operation of the device; and the invention consists in the combinations and constructions hereinafter set forth and claimed.

In describing this invention reference is had to the accompanying drawings in which like characters designate corresponding parts in all the views.

Figure 1 is a view in central longitudinal section through one form of clutch and operating mechanism used in connection with my invention. Fig. 2 is a transverse sectional view taken partly upon line "A—A," and partly upon line "B—B," Fig. 1, showing the retarding device in vertical cross section. Fig. 3 is a horizontal cross sectional view on line "C—C," Fig. 2. Fig. 4 is a detail sectional view showing particularly the means for adjusting two of the valves of the retarding device. Figs. 5, 6, 7, 8 and 9 are diagrammatic views showing different positions of the piston with respect to the stationary plungers or valves for effecting variable resistance.

I have here illustrated my retarding device as used in connection with a multiple disk clutch of a motor vehicle, and 1 and 2 are respectively, the bodies of the opposing members of the clutch which have associated therewith disks 3, 4, the disks 3, 4 being interleaved and connected respectively to the members 1, 2 to rotate therewith in any well known manner. The member 1 is formed with an abutment 5 against which the disks are compressed by the abutment 6 of the member 2, and the member 2 is moved axially in one direction by a powerful main spring 7.

The members 1, 2 are connected respectively to driving and driven shafts 8, 9 which are arranged in axial alinement, and the spring 7 is here shown as encircling the driven shaft 9 within the member 2 and as abutting, at one end against a collar 10 on the shaft 9 and at its other end against a shoulder 11 of the member 2.

The member 2 is moved against the action of the spring 7 to release the disks and hence disconnect the shaft 9 from the shaft 8, by a pedal lever 12 mounted on a rock shaft 13 which is journaled in an inclosing casing 14 of the clutch mechanism and which is provided with a yoke 15, Fig. 2, between its ends, the yoke having forks 16 connected to trunnions 17 on a non-rotatable collar 18 connected through antifriction members 19, to a collar 20 fixed to the clutch member 2. The driven shaft 9, as will be understood by those skilled in the art, is utilized to drive the transmission gearing of the motor vehicle.

The use of this retarding device in combination with a friction clutch to control the operations of the clutch forms no part of this invention but constitutes the subject matter of my application for "Means for controlling and regulating the operation of clutches," Sr. No. 599,690, filed Dec. 28, 1910, of which application this is a division.

The retarding device comprises means for effecting variable resistance and means for adjusting the former means for determining the point with respect to the movable element of the retarding device at which the resistance varies. The retarding device here shown comprises two elements, a cylinder 21, and a piston 22 having relative movement, and means whereby variable resistance is offered to the movable element. In this embodiment of my invention the cylinder 21 is shown as stationary and as connected to the case 14 of the clutch mechanism, and the piston 22 is shown as movable in the cylinder and as provided with a rod 23 pivoted at 24 to a rock arm 25 on the rock shaft 13 of the pedal lever 12, said rod extending through the head 26 of the cylinder. One of the elements 21, 22 is formed with a passage or channel connecting portions of the cylinder on opposite sides of the piston 22, and means is provided for controlling the passage, said means being adjustable for determining the point, with respect to the relative position of the piston and cylinder, at which the passage is opened and closed.

In the illustrated embodiment of my invention, this passage is formed in the piston, and usually the piston is formed with a plurality of passages or channels 27 and 28 extending through the upper and lower or front or rear faces thereof; and normally stationary valves are provided for controlling the flow of liquid as oil through these passages, these valves being adjustable axially. One of the passages as the passage 27 is provided with two valves or plungers 29, 30 arranged to control opposite ends thereof, the valves or plungers 29, 30 being spaced apart a greater distance than the end faces of the piston or than the length of the passage and being adjustable relatively to each other and to the piston, for varying the resistance and for changing the points at which the resistance becomes effective and ceases.

31 and 32 are stems for the valves, the stems extending parallel to the direction of movement of the piston, and being adjustable from the outside of the cylinder 21. As here illustrated said stems extend upwardly through the head 26 of the cylinder through the casing 14, and project through the upper wall of said casing, and the stem 31 of the valve 29 is arranged within, and concentric with, the stem 32 of the valve 30. As best seen in Fig. 4, the stem 32 threads into its passage in the upper wall of the casing 14, and the stem 31 threads at its upper end in the passage in the stem 32 and projects above the end of said stem 32; and both stems 31, 32 are provided with jam nuts 33 and 34 at their upper ends.

35 is a valve for controlling the passage 28, the valve 35 being similar to the valve 29, and provided with a stem 36 threading through the top wall 14 of the case, and having a jam nut 37 at its upper end. The piston 22 is also formed with a by-pass or channel 38 in its periphery, which by-pass is regulated by the valve or plug 39, this valve or plug 39 being adjustable only to open and close the by-pass 38 to a greater or less extent. The piston 22 is also formed with a spring pressed valve 40 closing a main passage 41 therethrough. This valve opens during the upward movement of the piston in order that the piston may be subject to a minimum resistance, and the valve closes during the downward movement of the piston so that the movement of the piston is sensitive to the variable resistance effected by the valves 29, 30 and 35.

The arrangement of the valves 29, 30 and 35 gives first, a period of minimum retardation, second, a period of greater retardation than the minimum, third, a period of less retardation than that of the second period, and fourth, a period of greater retardation than that of the third period, and the times or periods, with respect to the position of the piston 22, at which these periods or retardation begin and cease can be adjusted by means of the valves 29, 30 and 35.

The relative position of the valves or plungers 29, 30 and 35, with respect to the piston 22 when the parts are in their normal position, as in Figs. 1 and 2, is shown in detail in Fig. 5. When the pedal 22 is depressed to its greatest extent to entirely free the clutch, the piston 22 is lifted to a point wherein it occupies a relative position with respect to the plungers 29, 30 and 35, such as shown in Fig. 6, and such lifting movement will be resisted to a minimum degree by the liquid as oil in the cylinder 21 because the valve 40 will open freely during upward movement of the piston as will be understood. In the latter position, the passage or channel 27 is closed by the plunger 30 while the passage or channel 28 is open, the piston having in its upward movement moved clear of the valves or plungers 29, 35. If the piston be now released by reason of the fact that the pedal 22 is released, the action of the spring 7 will cause the parts to move in a direction wherein the piston will be forced downwardly and such movement will be relatively rapid until the piston 22 has descended to a point wherein the lower end of the passage or channel 28 reaches the valve head or plunger 35 and is closed by it, this position being shown in Fig. 7. Further downward movement of the piston and hence further movement of the parts connected therewith, will now be opposed to a greater degree by the liquid in the cylinder 21 because the main opening 41 is closed by the valve 40, while the channels or passages 27, 28 are closed by the plungers or valves 30, 35. The channel 38 is however open an amount determined by the adjustment of the plug or valve 39. The piston will therefore move at a slow rate of speed until the piston 22 reaches a point wherein the channel 27 will be opened by reason of its moving clear of the plunger 30 as shown in Fig. 8. The passage or channel 27 now forming a free connection between the upper and lower ends of the cylinder, the piston, may descend more freely or faster for a period until the channel 27 is again closed by the valve head 29 as shown in Fig. 9. Therefore for the remainder of its travel downwardly the piston 22 will move slowly until it reaches the bottom of the cylinder 21 at which time it will occupy its position shown in Fig. 5.

This device or dash pot is particularly advantageous in that the points at which the piston is retarded more or less can be accurately and easily adjusted relatively to the movements of the mechanism, as the clutch in connection with which the device is used.

I am well aware of United States patent to Hill for "Method of governing the movements of pistons in steam engines," dated February 10, 1891, No. 446,183, in which is shown two tapering pins mounted in alinement with each other and in opposite cylinder heads with the pointing ends projecting toward each other, and in alinement with an opening through the piston, so that the opening is constantly being closed and opened when the pins are in the opening, depending upon the direction of movement of the piston, and I make no claim to the construction therein disclosed.

What I claim is:

1. A retarding device having a cylinder and piston, the latter having an opening through it and means for adjusting the point at which the retarding action ceases, said means comprising an adjustable valve stem passing through the piston opening having a valve mounted thereon, the stem being of less diameter than the valve all arranged and operating substantially as hereinbefore set forth.

2. A retarding device comprising a cylinder and piston, the latter having an opening therethrough and means for adjusting the point at which retarding action begins and at which retarding action ceases, said means comprising adjustable valve stems projecting through the same cylinder head and having valves mounted thereon, arranged and operating substantially as shown.

3. A retarding device having means to effect variable resistance during its operation in combination with means for adjusting the points at which the resistance is effective, said means comprising adjustable valves, 29, 30 and 35, operating and arranged substantially as hereinbefore set forth.

4. A retarding device comprising two elements, one a cylinder and the other a piston in the cylinder, one of said elements being movable relatively to the other and one of said elements being formed with a passage connecting portions of the cylinder on opposite sides of the piston, and means for controlling the flow through the passage, said means being adjustable for determining the point, with respect to the relative position of the cylinder and piston, at which the resistance varies and comprising valves to fill and close said opening and mounted on adjustable stems projecting through the same cylinder-head, substantially as and for the purpose specified.

5. In combination with a motor and a motor casing a retarding device comprising two elements, one a cylinder, and the other a piston movable in the cylinder, one of said elements being formed with a passage connecting the portions of the cylinder on opposite sides of the piston, and a valve 35 having an adjustable stem projecting through the cylinder-head and through the casing 14 for controlling the flow through said passage for causing the piston to be subject to variable resistances, said valve being adjustable for controlling the point, with respect to the position of the piston, at which the resistance is varied, substantially as and for the purpose set forth.

6. In combination with a motor and a motor casing a retarding device comprising a cylinder and a piston movable in the cylinder, the piston being formed with a passage therethrough connecting the portions of the cylinder on opposite sides of the piston, and a normally stationary valve for controlling the flow through the passage and varying the resistance of the piston during the movement thereof, the valve being adjustable from a point outside the casing 14 to vary the point, with respect to the position of the piston, at which the resistance varies, substantially as and for the purpose described.

7. A retarding device comprising a cylinder, a piston movable in the cylinder, the device being formed with a plurality of passages connecting portions of the cylinder on opposite sides of the piston, and normally stationary valves for controlling the flow through the passages whereby variable resistances are offered to the piston, the valves being adjustable for varying the point, with respect to the position of the piston, at which the resistances become effective, substantially as and for the purpose specified.

8. A retarding device comprising two elements, one a cylinder and the other a piston movable in the cylinder, one of said elements being formed with a passage connecting portions of the cylinder on opposite sides of the piston, two valves 29 and 30 arranged to control opposite ends of the passage and thereby cause variable resistances to be offered to the piston, and means for adjusting the valves from the same point relatively to each other and to the passage whereby the point, with respect to the position of the piston, at which the variable resistances become effective, are determined, substantially as and for the purpose set forth.

9. A retarding device comprising two elements, one a cylinder and the other a piston movable in the cylinder, one of said elements being formed with a passage connecting portions of the cylinder on opposite sides of the piston, two valves arranged to control opposite ends of the passage and thereby cause variable resistances to be offered to the piston, the valves being spaced apart a greater distance than the distance between front and rear faces of the piston, and means for adjusting the valves relatively to each other and to the passage whereby the points, with respect to the positions of the piston, at which the variable resistances become effective, are determined, substantially as and for the purpose described.

10. A retarding device comprising a cylinder, a piston movable in the cylinder, the piston having a passage opening through its opposite end faces for connecting portions of the cylinder on opposite sides of the piston, and normally stationary valves for controlling opposite end portions of the passage and thereby causing variable resistances, the valves being spaced apart a greater distance than the length of the passage one being adjustable on the stem of the other, substantially as and for the purpose specified.

11. A retarding device comprising a cylinder and a piston movable in the cylinder, the piston having a passage opening through its opposite end faces for connecting portions of the cylinder on opposite sides of the piston, valves for controlling opposite end portions of the passage and thereby causing variable resistances, said valves being adjustable together relatively to the piston and independently adjustable with reference to each other for determining the points, with respect to the position of the piston, at which the resistances become effective and cease, and means for adjusting the valves, substantially as and for the purpose set forth.

12. A retarding device comprising two elements, one a cylinder and the other a piston movable in the cylinder, one of said elements being formed with a passage connecting portions of the cylinder on opposite sides of the piston, a valve for controlling the passage and a stem for the valve, the stem extending parallel to the direction of movement of the piston to the outside of the cylinder and being adjustable from a point remote from the cylinder head relatively to the piston for changing the point, with respect to the position of the piston, at which the resistance varies, substantially as and for the purpose described.

13. A retarding device comprising two elements, one a cylinder and the other a piston movable in the cylinder, one of said elements being formed with a passage connecting portions of the cylinder on opposite sides of the piston, valves for controlling opposite end portions of the passage and thereby causing variable resistances, and stems for the valves, the stems extending parallel to the direction of movement of the piston, the stem of one valve being arranged within the stem of the other valve and each stem being adjustable relatively to the other stem, substantially as and for the purpose specified.

14. A retarding device comprising a cylinder, and a piston movable in the cylinder, the device being formed with a plurality of passages connecting portions of the cylinder on opposite sides of the piston, and valves for controlling the passages, the valves having stems both extending to the outside of the cylinder through the same cylinder head and adjustable independently of each other for changing the positions of the valves, substantially as and for the purpose set forth.

15. A retarding device comprising a cylinder, a piston movable in the cylinder, the piston being formed with a plurality of passages connecting the portions of the cylinder on opposite sides of the piston, valves for controlling opposite ends of one of the passages, stems for the valves, the stems extending parallel to the direction of movement of the piston, and the stem of one valve extending within the stem of the other valve, and each of said stems being adjustable relatively to the piston for changing the relative positions of the valves with respect to each other and with respect to the piston, a valve for the other passage and a stem for the latter extending in the same direction as the stems of the other valves and being adjustable for changing the position thereof with respect to the other valves and with respect to the position of the piston, the stems of all the valves being adjustable relatively to each other from the outside of the cylinder, substantially as and for the purpose described.

In testimony whereof, I have hereunto signed my name in the presence of two attesting witnesses, at Fulton, in the county of Oswego, in the State of New York, this 25th day of October, 1912.

CLARK W. PARKER.

Witnesses:
C. A. BACHE,
L. I. CROCKETT.

Copies of this patent may be obtained for five cents each, by addressing the "Commissioner of Patents, Washington, D. C."